(12) United States Patent
Moriya et al.

(10) Patent No.: US 12,346,804 B2
(45) Date of Patent: Jul. 1, 2025

(54) ACOUSTIC MODEL LEARNING APPARATUS, MODEL LEARNING APPARATUS, METHOD AND PROGRAM FOR THE SAME

(71) Applicant: NIPPON TELEGRAPH AND TELEPHONE CORPORATION, Tokyo (JP)

(72) Inventors: Takafumi Moriya, Tokyo (JP); Yusuke Shinohara, Tokyo (JP); Yoshikazu Yamaguchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 1102 days.

(21) Appl. No.: 17/288,848

(22) PCT Filed: Oct. 25, 2019

(86) PCT No.: PCT/JP2019/041892
§ 371 (c)(1),
(2) Date: Apr. 26, 2021

(87) PCT Pub. No.: WO2020/090651
PCT Pub. Date: May 7, 2020

(65) Prior Publication Data
US 2022/0004868 A1    Jan. 6, 2022

(30) Foreign Application Priority Data

Oct. 29, 2018   (JP) ................. 2018-203094

(51) Int. Cl.
 *G06N 3/08*   (2023.01)
 *G06N 3/045*  (2023.01)
 *G10L 25/30*  (2013.01)

(52) U.S. Cl.
 CPC ............ *G06N 3/08* (2013.01); *G06N 3/045* (2023.01); *G10L 25/30* (2013.01)

(58) Field of Classification Search
 CPC .......... G06N 3/08; G06N 3/045; G10L 25/30
 USPC ........................................... 706/15
 See application file for complete search history.

(56) References Cited

U.S. PATENT DOCUMENTS

2017/0169313 A1* 6/2017 Choi .................. G06V 10/82

OTHER PUBLICATIONS

Tsukimoto, et al., "Extracting rules from trained neural networks", IEEE Transactions on Neural Networks, vol. 11, No. 2, Mar. 2000 (Year: 2000).*

(Continued)

*Primary Examiner* — Tsu-Chang Lee

(57) ABSTRACT

An acoustic model learning apparatus includes a parameter updating part configured to update a parameter of a second acoustic model on the basis of a first loss for a feature amount for training, based on output probability distribution of the second acoustic model which is a neural network acoustic model to be trained, and a second loss for a feature amount for training, based on an intermediate feature amount of a first acoustic model which is a trained neural network acoustic model and an intermediate feature amount of the second acoustic model.

9 Claims, 7 Drawing Sheets

(56) References Cited

OTHER PUBLICATIONS

Geoffrey Hinton et al. (2012) "Deep Neural Networks for Acoustic Modeling in Speech Recognition," IEEE Signal Processing Magazine, vol. 29, No. 6, pp. 82-97.
Geoffrey Hinton et al. (2015) "Distilling the Knowledge in a Neural Network." arXiv: 1503.02531v1, Mar. 9, 2015.

* cited by examiner

ACOUSTIC MODEL LEARNING APPARATUS, MODEL LEARNING APPARATUS, METHOD AND PROGRAM FOR THE SAME

CROSS-REFERENCE TO RELATED APPLICATIONS

This application is a U.S. 371 Application of International Patent Application No. PCT/JP2019/041892, filed on 25 Oct. 2019, which application claims priority to and the benefit of JP Application No. 2018-203094, filed on 29 Oct. 2018, the disclosures of which are hereby incorporated herein by reference in their entireties.

TECHNICAL FIELD

The present invention relates to an acoustic model learning apparatus which efficiently trains a model, a model learning apparatus, a method thereof, and a program.

BACKGROUND ART

FIG. 1 illustrates a functional block diagram of a learning apparatus for implementing a typical learning method of a neural network (hereinafter, also referred to as "related art 1"). A method for training a neural network acoustic model (hereinafter, simply referred to as an "acoustic model") for speech recognition using this learning method is disclosed in a section of "TRAINING DEEP NEURAL NETWORKS" in Non-patent literature 1.

A pair of a feature amount (feature amount for training, including a real vector) extracted from each sample of training data (acoustic signal for training) and a correct unit identification number (correct solution) corresponding to each feature amount, and an appropriate initial model are prepared in advance. As the initial model, a neural network in which random numbers are allocated to respective parameters, a neural network which has already been trained with another training data, or the like, can be utilized.

An intermediate feature amount extracting part 101 calculates an intermediate feature amount for making it easier for an output probability distribution calculating part 102 to identify a correct unit, from the input feature amount using the following expression.

[Formula 1]

$$y_j = \mathrm{logistic}(x_j) = \frac{1}{1+e^{-x_j}}, \quad x_j = b_j + \sum_i y_i w_{ij} \quad (1)$$

In the expression, j is an index indicating a unit, i is an index indicating a unit included in a lower layer of the unit j, $y_j$ indicates an intermediate feature amount of the unit j, logistic( ) indicates a logistic function, $b_j$ indicates a bias of the unit j, and $w_{ij}$ indicates a connection weight from the lower unit i to the unit j.

This intermediate feature amount extracting part 101 is constituted with an input layer and an intermediate layer of a neural network including a plurality of layers, and calculation for extracting a feature amount (hereinafter, simply referred to as an "intermediate feature amount") is performed the number of times corresponding to the number of the intermediate layers.

The output probability distribution calculating part 102, which is constituted with an output layer of the neural network, inputs the intermediate feature amount extracted at the intermediate feature amount extracting part 101 to a current model to calculate output probability distribution in which probabilities (output probabilities $p_j$) of respective units of the output layer are distributed, using the following expression.

[Formula 2]

$$p_j = \frac{\exp(y_j)}{\sum_k \exp(y_k)} \quad (2)$$

A first model updating part 103 calculates a loss function C from the correct unit identification number and the output probability distribution using the following expression.

[Formula 3]

$$C = -\sum_j d_j \log p_j \quad (3)$$

In the expression, in a case of a unit corresponding to the correct unit identification number, $d_j$ assumes a value of 1, and in a case of other units, $d_j$ assumes a value of 0.

Further, the first model updating part 103 updates a model using the following expression so as to decrease a value of the loss function C.

[Formula 4]

$$\hat{W} = W - \epsilon \frac{\partial C}{\partial W} \quad (4)$$

In the expression, W is a matrix including the connection weight $w_{ij}$ as an element, $\hat{W}$ indicates a model after updating, and $\epsilon$ indicates a training rate. Note that $b_j$ is also updated in a similar manner.

Processing of extracting an intermediate feature amount, calculating an output probability and updating a model described above is repeated for each pair of the feature amount of training data and the correct unit identification number, and a model at a time point at which a predetermined number of times (normally, several ten times to several hundred times) of repetition has been completed is utilized as a trained model.

FIG. 2 illustrates a functional block diagram of a learning apparatus for implementing a method for making behavior of a model which is to be trained (hereinafter, also referred to as a "model to be trained") resemble behavior of a trained model with high performance (hereinafter, also referred to as related art 2).

A loss function in typical training of a neural network is expressed with the following expression.

[Formula 5]

$$L_{Hard}(\theta) = -\sum_{j=1}^{K} f_j \log p_j \quad (5)$$

This $L_{Hard}(\theta)$ is C in the above-described expression (3), and $\theta$ is a parameter ($w_{ij}$, $b_j$ in expression (1)) to be used at the intermediate feature amount extracting part 101 and the output probability distribution calculating part 102. Further, $f_j$ indicates a correct label. The correct label $f_j$ is an element of a One-hot vector in a K dimension (the number of classes of classification), and this One-hot vector is a vector in which only an element (correct label $f_j$) in a dimension corresponding to a correct class is 1, and other elements (correct label $f_j$) are all 0.

Non-patent literature 2 discloses a learning method in which a cross entropy of an output probability $p_j$ of a model to be trained and an output probability $q_j$ of a trained acoustic model, as indicated in the following expression, is set as a loss function.

[Formula 6]

$$L_{Soft}(\theta) = -\Sigma_{j=1}^{K} q_j \log p_j \quad (6)$$

In expression (6), the output probability $q_j$ of the trained acoustic model is used as the correct label.

This expression corresponds to a first term ($KL(p^g, q)$) in expression (5) in Non-patent literature 2.

Further, a learning method in which the above-described loss functions are combined through linear interpolation as in the following expression has also been proposed.

$$L_{KD}(\theta) = (1-\lambda)L_{Hard}(\theta) + \lambda L_{Soft}(\theta) \quad (7)$$

$\lambda$ is a hyper parameter indicating a loss function on which weight is to be given.

In related art 2, the intermediate feature amount extracting part 101 and the output probability distribution calculating part 102 obtain the output probability $q_j$ of the trained acoustic model from the feature amount. Further, an intermediate feature amount extracting part 101B and an output probability distribution calculating part 102B obtain the output probability $p_j$ of the model to be trained from the feature amount. Then, a second model updating part 203 obtains a loss $L_{KD}(\theta)$ by calculating the expressions (5) to (7) and updates the model so that the loss $L_{KD}(\theta)$ becomes small.

PRIOR ART LITERATURE

Non-Patent Literature

Non-patent literature 1: Geoffrey Hinton, Li Deng, Dong Yu, George E. Dahl, Abdel-rahman Mohamed, Navdeep Jaitly, Andrew Senior, Vincent Vanhoucke, Patric Nguyen, Tara N. Sainath and Brian Kingsbury, "Deep Neural Networks for Acoustic Modeling in Speech Recognition," IEEE Signal Processing Magazine, Vol. 29, No 6, pp. 82-97, 2012
Non-patent literature 2: G. Hinton, O. Vinyals, J. Dean, "Distilling the Knowledge in a Neural Network." arXiv, abs/1503.02531, 2015

SUMMARY OF THE INVENTION

Problems to be Solved by the Invention

In related art 2, a parameter of a model is trained using only an output probability of the trained model. However, due to an enormous number of dimensions of the output probability vector, there is a case where it is difficult for a model to be trained to grasp behavior only with the output probability provided from the trained model.

The present invention is directed to providing an acoustic model learning apparatus which trains a model so as to imitate behavior of an intermediate feature amount (intermediate output) with a smaller number of dimensions in addition to an output probability of a trained model, a model learning apparatus, a method thereof, and a program.

Means to Solve the Problems

To solve the above-described problem, according to one aspect of the present invention, an acoustic model learning apparatus comprises a parameter updating part configured to update a parameter of a second acoustic model on a basis of a first loss for a feature amount for training, based on output probability distribution of the second acoustic model which is a neural network acoustic model to be trained, and a second loss for a feature amount for training, based on an intermediate feature amount of a first acoustic model which is a trained neural network acoustic model and an intermediate feature amount of the second acoustic model.

To solve the above-described problem, according to another aspect of the present invention, a model learning apparatus comprises a parameter updating part configured to update a parameter of a second model on a basis of a first loss for a feature amount for training, based on output probability distribution of the second model which is a neural network model to be trained, and a second loss for a feature amount for training, based on an intermediate feature amount of a first model which is a trained neural network model and an intermediate feature amount of the second model.

Effects of the Invention

According to the present invention, behavior in the middle of a model to be trained is also trained so as to resemble a trained model, which makes a value of the model closer to a value of an output probability of the trained model with high performance, so that it is possible to construct a high-accuracy model compared to a case where training is performed using a loss function as disclosed in related art 1 and related art 2.

DETAILED DESCRIPTION OF THE EMBODIMENTS

Figure 1:
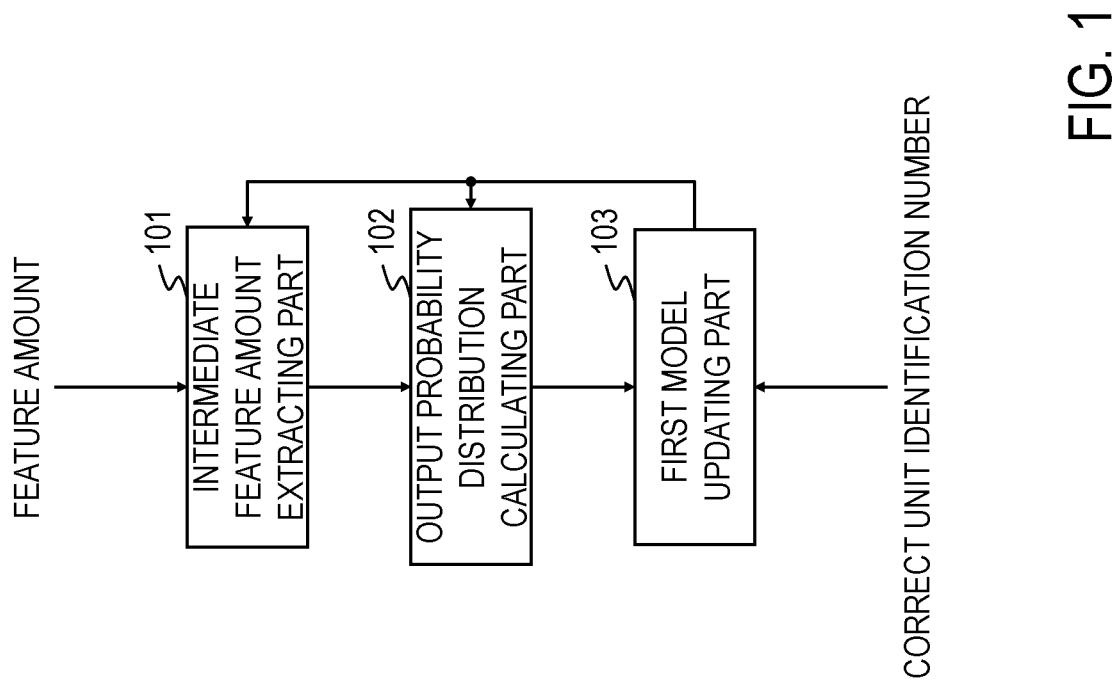
FIG. 1 is a functional block diagram of an acoustic model learning apparatus in related art 1.

Embodiments of the present invention will be described below. Note that the same reference numerals will be assigned to components having the same functions and steps performing the same processing in the drawings used for the following description, and repetitive descriptions will be omitted. In the following description, while a symbol "^", and the like, used in text should be originally described immediately above an immediately preceding character, the symbol is described immediately after the character due to restriction of text notation. In expressions, these symbols are described at original positions. Further, it is assumed that processing which is performed in units of each element of a vector or a matrix is applied to all elements of the vector or the matrix unless otherwise specified.

Configurations of acoustic model learning apparatuses in related art 1 and related art 2 will be described first to facilitate understanding of a configuration of an acoustic model learning apparatus according to the present invention.
<Related Art 1>
FIG. 1 illustrates a functional block diagram of an acoustic model learning apparatus according to related art 1.

The acoustic model learning apparatus includes an intermediate feature amount extracting part 101, an output probability distribution calculating part 102, and a first model updating part 103.

The acoustic model learning apparatus trains an acoustic model using training data including a feature amount for training and a correct solution (correct unit identification number) corresponding to the feature amount as input. Note that the acoustic model learning apparatus may output a trained acoustic model to an external device (such as, for example, a speech recognition device) which utilizes the trained acoustic model. The acoustic model learning apparatus may extract a feature amount for training from an acoustic signal for training which is input. It can be said that the feature amount for training corresponds to the acoustic signal for training, and a correct solution (correct unit identification number) corresponds to the acoustic signal for training.

Respective parts will be described below.
[Intermediate Feature Amount Extracting Part 101]
Input: feature amount
Output: intermediate feature amount $y_j$
Processing:
The intermediate feature amount extracting part 101 calculates an intermediate feature amount for making it easier for the output probability distribution calculating part 102 to identify a correct unit, from the input feature amount using the following expression.

[Formula 7]

$$y_j = \text{logistic}(x_j) = \frac{1}{1+e^{-x_j}}, \quad x_j = b_j + \sum_i y_i \, w_{ij} \qquad (1)$$

This intermediate feature amount extracting part 101 is constituted with an input layer and an intermediate layer of a neural network including a plurality of layers, and calculation of extracting a feature amount (hereinafter, simply referred to as an "intermediate feature amount") is performed the number of times corresponding to the number of the intermediate layers.

For example, the number of units of the input layer of the neural network matches the number of dimensions of a feature amount (real vector), and, in the input layer, each element of the feature amount is set as a value of each unit of the input layer. Further, in the intermediate layer, a value (intermediate feature amount $y_j$) of each unit j is obtained with the above-described expression (1). Processing in the output layer is performed at the following output probability distribution calculating part 102.

The intermediate feature amount extracting part 101 outputs the intermediate feature amount $y_j$ of the last intermediate layer (intermediate layer which is one layer before the output layer).
[Output Probability Distribution Calculating Part 102]
Input: intermediate feature amount $y_i$
Output: output probability distribution (distribution of output probabilities $p_j$)
Processing:
The output probability distribution calculating part 102 inputs the intermediate feature amount extracted at the intermediate feature amount extracting part 101 to a current model to calculate output probability distribution (distribution of the output probabilities $p_j$) in which probabilities of respective units j of the output layer are distributed, using the following expression.

[Formula 8]

$$p_j = \frac{\exp(y_j)}{\sum_k \exp(y_k)} \qquad (2)$$

In the expression, a way of obtaining $y_j$ is as described in expression (1). This output probability distribution calculating part 102 is constituted with the output layer of the neural network. This output probability distribution calculating part 102 calculates an output symbol of a speech (phoneme state) of the intermediate feature amount which is calculated to make it easier to identify a feature amount of a speech in a case of speech recognition, and obtains output probability distribution corresponding to the feature amount of the input speech.
[First Model Updating Part 103]
Input: model before updating, output probability distribution, correct unit identification number
Output: updated model
Processing:
The first model updating part 103 calculates a loss function C (expression (3) in Non-patent literature 1) from the correct unit identification number and the output probability distribution obtained from the output probability distribution calculating part 102 using the following expression.

[Formula 9]

$$C = -\sum_j d_j \log p_j \qquad (3)$$

Further, the first model updating part 103 updates a parameter W of the model using the following expression so as to decrease a value of the loss function C.

[Formula 10]

$$\hat{W} = W - \epsilon \frac{\partial C}{\partial W} \qquad (4)$$

A bias $b_j$ in expression (1) is also updated in a similar manner. Note that the updated parameter may be stored in a storage part which is not illustrated and may be utilized upon next updating. The above-described processing of extracting an intermediate feature amount, calculating an output probability and updating a model is repeated for each pair of the feature amount of the training data and the correct unit identification number, and a model at a time point at which a predetermined number of times (normally, several ten times to several hundred times) of repletion has been completed is utilized as the trained model.

<Related Art 2>

An acoustic model learning apparatus in related art 2 will be described next.

Portions different from those in related art 1 will be mainly described.

Figure 2:
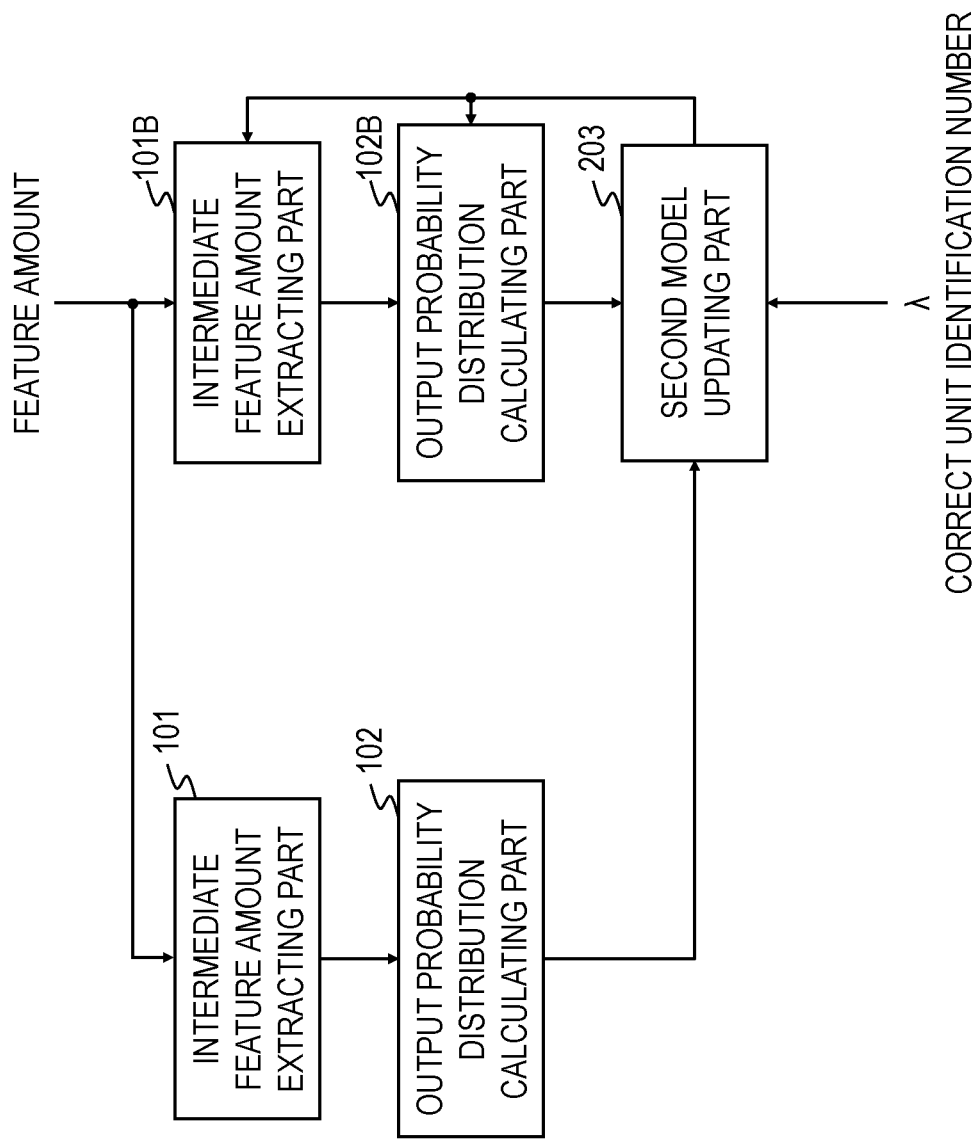
FIG. 2 is a functional block diagram of an acoustic model learning apparatus in related art 2.

FIG. 2 illustrates a functional block diagram of the acoustic model learning apparatus according to related art 2.

The acoustic model learning apparatus includes the intermediate feature amount extracting part 101, the output probability distribution calculating part 102, an intermediate feature amount extracting part 101B, an output probability distribution calculating part 102B, and a second model updating part 203.

Processing at the intermediate feature amount extracting part 101, the output probability distribution calculating part 102, the intermediate feature amount extracting part 101B and the output probability distribution calculating part 102B are similar to those in related art 1. However, a model utilized at the intermediate feature amount extracting part 101 and the output probability distribution calculating part 102 is a trained model, and parameters (a weight $w_{ij}$ and a bias $b_j$) are not updated. Note that, here, an output probability calculated by utilizing the trained model is expressed as $q_j$. Training data which is input to the acoustic model learning apparatus may be used as training data which has been utilized for training the trained model to train behavior of the model to be trained so as to resemble the trained model.

[Second Model Updating Part 203]

Figure 3:
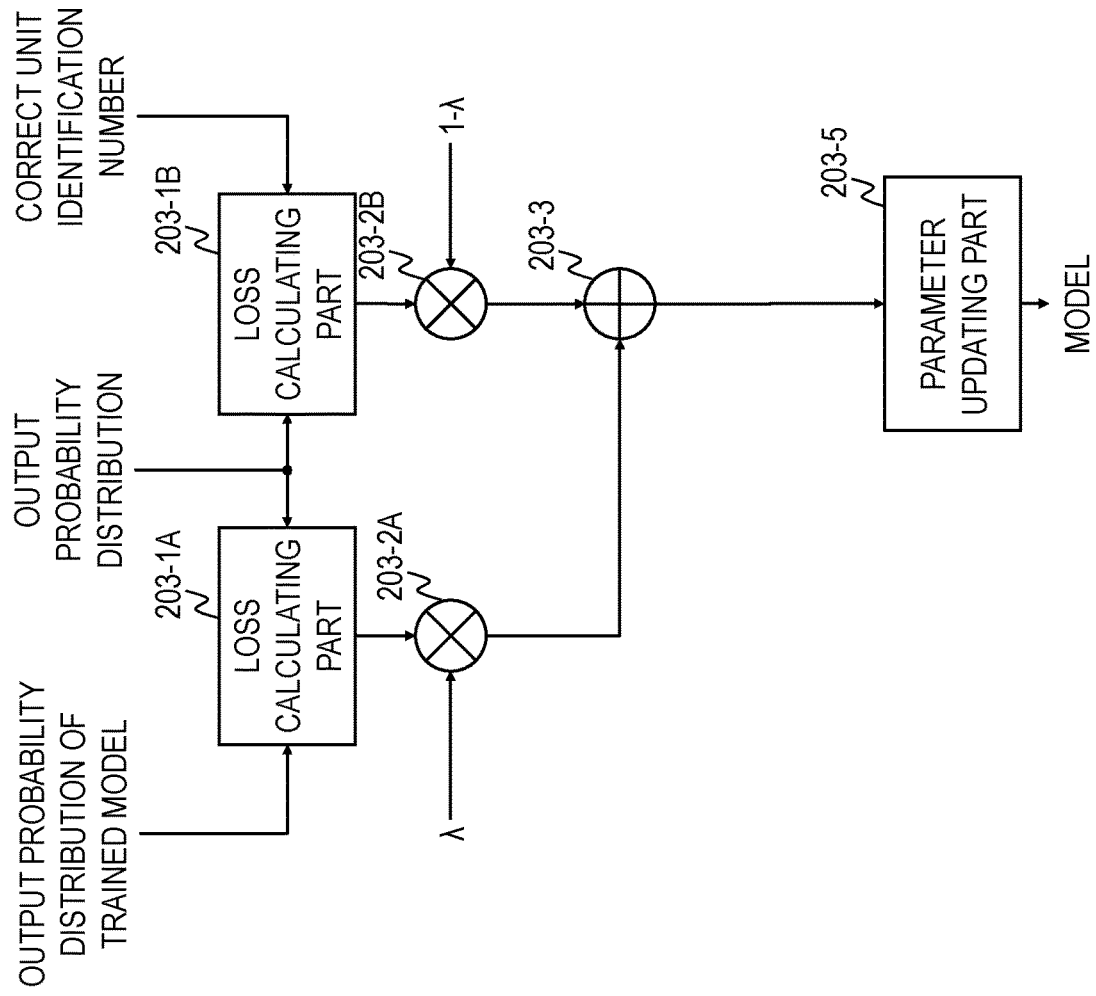
FIG. 3 is a functional block diagram of a second model updating part.

Input: model before updating, output probability distribution of model to be trained (hereinafter, also simply referred to as "output probability distribution"), correct unit identification number, output probability distribution of trained model, hyper parameter $\lambda$ Output: updated model Processing:

FIG. 3 illustrates a functional block diagram of the second model updating part 203.

The second model updating part 203 includes loss calculating parts 203-1A and 203-1B, multiplying parts 203-2A and 203-2B, an adding part 203-3, and a parameter updating part 203-5.

The loss calculating part 203-1B calculates a loss between the model to be trained and a correct solution, and the loss calculating part 203-1A calculates a loss between the model to be trained and the trained model. A final loss is obtained through a sum of linear interpolation using the hyper parameter $\lambda$ (see the following expression).

$$L_{KD}(\theta)=(1-\lambda)L_{Hard}(\theta)+\lambda L_{Soft}(\theta) \quad (7)$$

The parameter updating part 203-5 updates a model parameter on the basis of this final loss.

[Loss Calculating Part 203-1A]

Input: output probability distribution (distribution of $p_j$), output probability distribution of the trained model (distribution of $q_j$)

Output: loss $L_{Soft}(\theta)$

Processing:

A loss indicating a deviation between output of the model to be trained and output of the trained model is calculated using the following expression.

[Formula 11]

$$L_{Soft}(\theta)=-\Sigma_{j=1}^{K}q_j \log p_j \quad (6)$$

[Loss Calculating Part 203-1B]

Input: output probability distribution (distribution of $p_j$), correct unit identification number Output: loss $L_{Hard}(\theta)$ Processing:

A loss indicating a deviation between output of the model to be trained and a correct solution is calculated using the following expression.

[Formula 12]

$$L_{Hard}(\theta) = -\sum_{j=1}^{K} f_j \log p_j \quad (5)$$

Note that a correct label $f_j$ is an element of a One-hot vector in a K dimension (the number of classes of classification), and this One-hot vector is a vector in which only an element (correct label $f_j$) in a dimension corresponding to a correct class is 1, and other elements (correct label $f_j$) are all 0.

The multiplying part 203-2A multiplies the loss $L_{Soft}(\theta)$ by the hyper parameter $\lambda$ to obtain a product $\lambda L_{Soft}(\theta)$, and the multiplying part 203-2B multiplies the loss $L_{Hard}(\theta)$ by $(1-\lambda)$ to obtain a product $(1-\lambda)L_{Hard}(\theta)$.

The adding part 203-3 adds $\lambda L_{Soft}(\theta)$ and $(1-\lambda)L_{Soft}(\theta)$ to obtain a sum $(1-\lambda)L_{Hard}(\theta)+\lambda L_{Soft}(\theta)$. Note that $L_{KD}(\theta)$ is set such that $$L_{KD}(\theta)=(1-\lambda)L_{Hard}(\theta)+\lambda L_{Soft}(\theta) \quad (7)$$

$L_{KD}(\theta)$ is set as a final loss.

[Parameter Updating Part 203-5]

Input: model before updating, loss $L_{KD}(\theta)$

Output: updated model

Processing:

The parameter updating part 203-5 updates the model using the following expression so as to decrease a value of the loss $L_{KD}(\theta)$.

[Formula 13]

$$\hat{W} = W - \epsilon \frac{\partial C}{\partial W} \quad (4)$$

In the expression, $C=L_{KD}(\theta)$. The bias $b_j$ is also updated in a similar manner.

A first embodiment of the present invention will be described next.

Point of First Embodiment

The first embodiment enables training of a model having recognition accuracy which is closer to that of the trained model by adding a loss obtained at a second loss calculating part 303-1 which will be described later to a loss to be input to the parameter updating part 203-5 at the second model updating part 203 in related art 2.

First Embodiment

Figure 4:
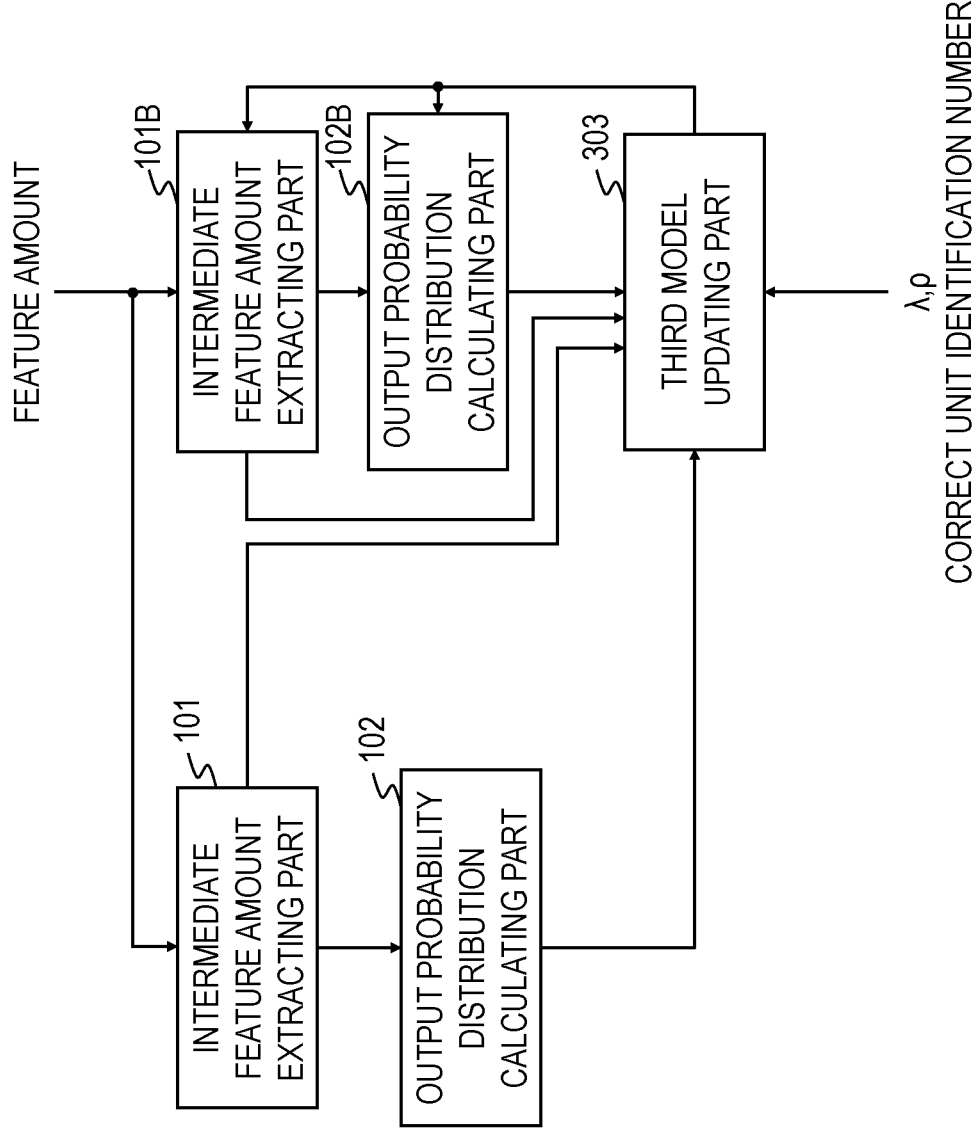
FIG. 4 is a functional block diagram of an acoustic model learning apparatus according to a first embodiment.
Figure 5:
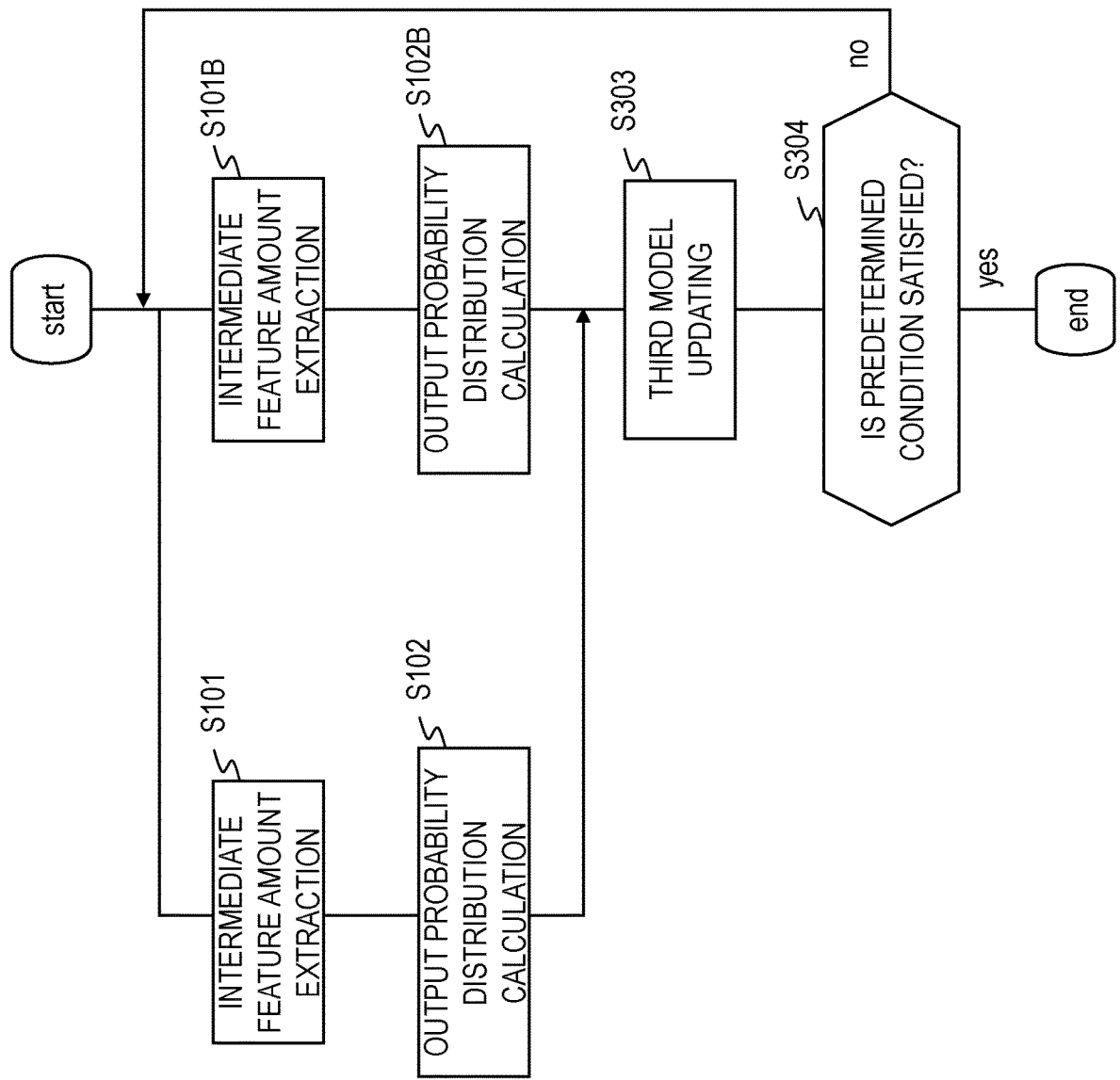
FIG. 5 is a view illustrating an example of processing flow of the acoustic model learning apparatus according to the first embodiment.

FIG. 4 illustrates a functional block diagram of an acoustic model learning apparatus according to the first embodiment, and FIG. 5 illustrates processing flow of the acoustic model learning apparatus.

The acoustic model learning apparatus includes the intermediate feature amount extracting part 101, the output probability distribution calculating part 102, the intermediate feature amount extracting part 101B, the output probability distribution calculating part 102B, and a third model updating part 303.

Processing at the intermediate feature amount extracting part 101, the output probability distribution calculating part 102, the intermediate feature amount extracting part 101B, and the output probability distribution calculating part 102B (intermediate feature amount extraction processing S101, output probability distribution calculation processing S102, intermediate feature amount extraction processing S101B and output probability distribution calculation processing S102B) are similar to those in related art 2. However, an intermediate feature amount $h_{trained}^{(m)}$ in the m-th layer of the neural network including a plurality of layers which constitute the intermediate feature amount extracting part 101 is output to the third model updating part 303, and an intermediate feature amount $h_{train}^{(n)}$ in the n-th layer of the neural network including a plurality of layers which constitute the intermediate feature amount extracting part 101B is output to the third model updating part 303. In the present embodiment, processing at the third model updating part 303 will be mainly described.

The acoustic model learning apparatus trains an acoustic model using training data including a feature amount for training and a correct solution (correct unit identification number) corresponding to the feature amount, and hyper parameters λ and ρ as input. Note that the acoustic model learning apparatus may output the trained acoustic model to an external device (such as, for example, a speech recognition device) which utilizes the trained acoustic model.

The acoustic model learning apparatus is a special device constituted by, for example, a special program being loaded to a publicly known or dedicated computer including a central processing unit (CPU), a main storage device (RAM: Random Access Memory), and the like. The acoustic model learning apparatus, for example, executes respective kinds of processing under control by the central processing unit. Data input to the acoustic model learning apparatus and data obtained through respective kinds of processing are, for example, stored in the main storage device, and the data stored in the main storage device is read out to the central processing unit as necessary and utilized for other kinds of processing. At least part of respective processing parts of the acoustic model learning apparatus may be constituted with hardware such as an integrated circuit. Respective storage parts provided at the acoustic model learning apparatus can be, for example, constituted with a main storage device such as a RAM (Random Access Memory) or middleware such as a relational database and a key value store. However, the respective storage parts do not necessarily have to be provided inside the acoustic model learning apparatus, may be constituted with an auxiliary storage device constituted with a hard disk, an optical disk or a semiconductor memory device such as a flash memory, and may be provided outside the acoustic model learning apparatus.

[Third Model Updating Part 303]
Input: model before updating, output probability distribution (of model to be trained), correct unit identification number, output probability distribution of trained model, intermediate feature amount (of model to be trained), intermediate feature amount of trained model, λ, ρ
Output: updated model
Processing:

The third model updating part 303 updates a parameter of an acoustic model to be trained on the basis of a first loss $L_{KD}$ based on output probability distribution of the model to be trained (distribution of the output probabilities $p_j$) and a second loss $L_{MSE}(\theta)$ based on the intermediate feature amount $h_{trained}^{(m)}$ of the trained acoustic model and the intermediate feature amount $h_{train}^{(n)}$ of the acoustic model to be trained (S303).

In the present embodiment, the third model updating part 303 calculates the first loss $L_{KD}$ from a first A loss $L_{Soft}$ and a first B loss $L_{Hard}$. The first A loss $L_{Soft}$ is calculated from the output probability distribution of the trained acoustic model (distribution of the output probabilities $q_j$) and the output probability distribution of the acoustic model to be trained (distribution of the output probabilities $p_j$). The first B loss $L_{Hard}$ is calculated from the output probability distribution of the acoustic model to be trained (distribution of the output probabilities $p_j$) and a correct solution to the acoustic signal for training.

Figure 6:
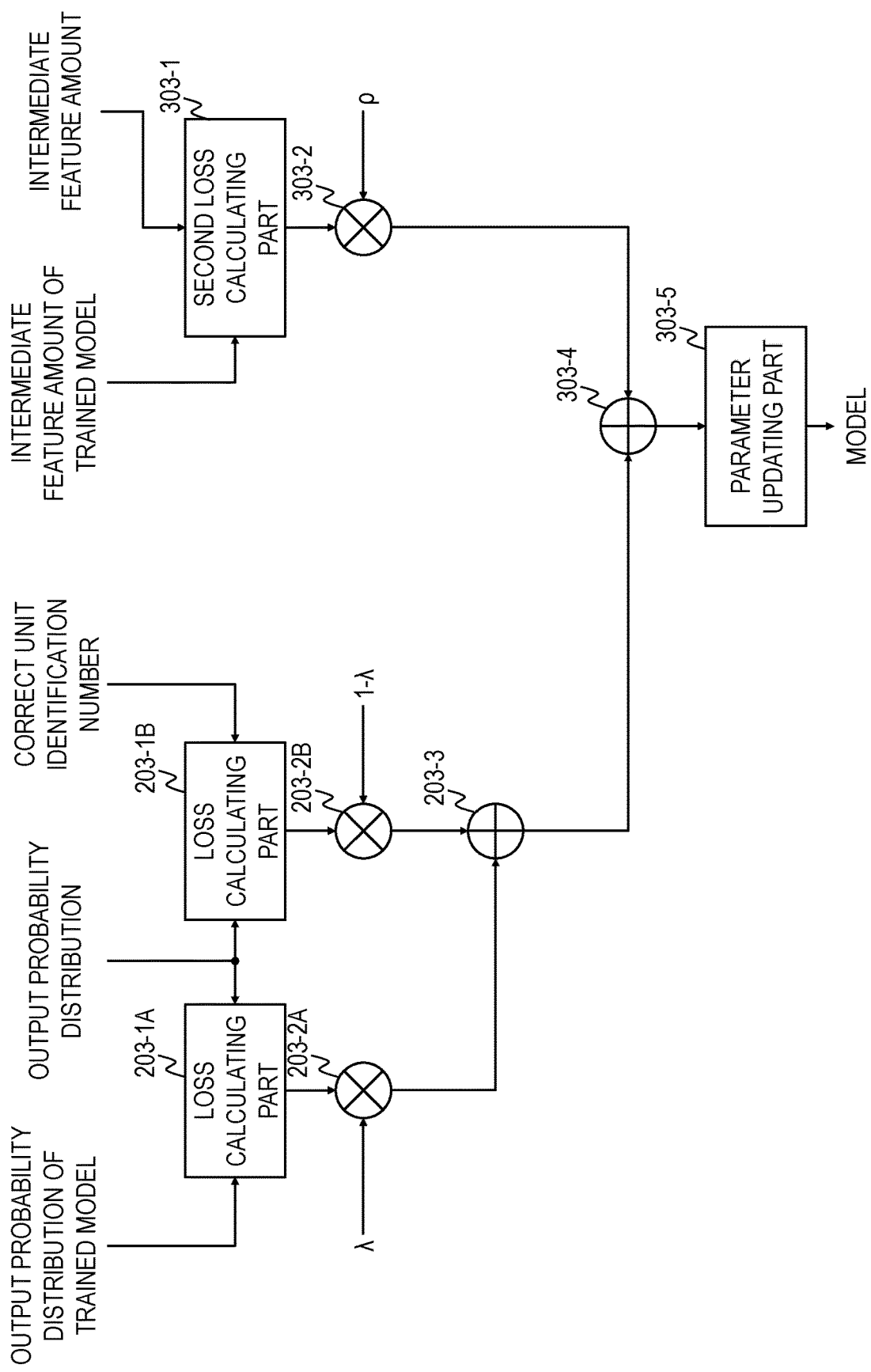
FIG. 6 is a functional block diagram of a second model updating part according to the first embodiment.
Figure 7:
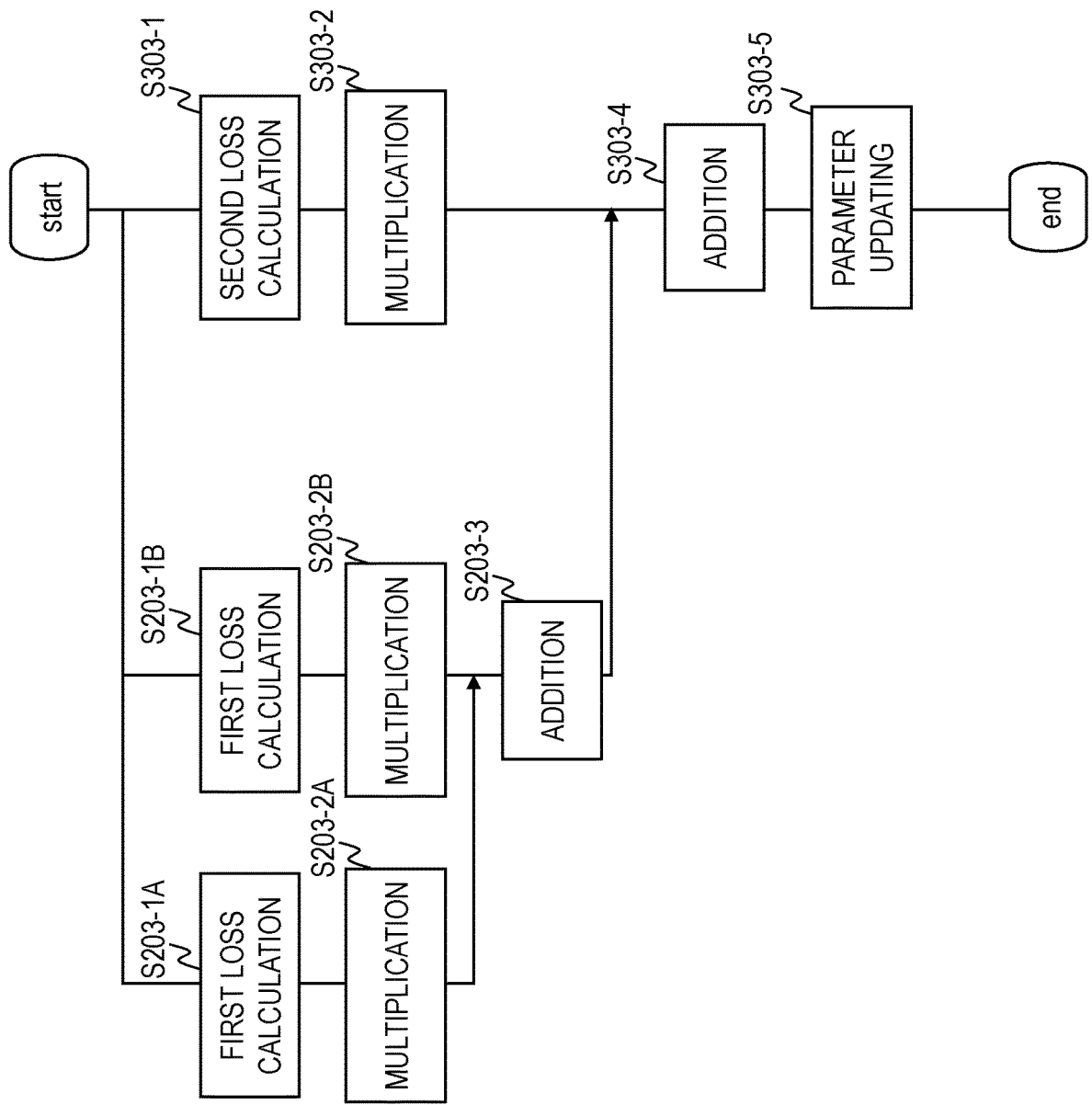
FIG. 7 is a view illustrating an example of processing flow of the second model updating part according to the first embodiment.

FIG. 6 illustrates a functional block diagram of the third model updating part 303, and FIG. 7 illustrates an example of processing flow of the third model updating part 303.

The third model updating part 303 includes the loss calculating parts 203-1A and 203-1B, the multiplying parts 203-2A and 203-2B, the adding part 203-3, a second loss calculating part 303-1, a multiplying part 303-2, an adding part 303-4, and a parameter updating part 303-5. Processing at the loss calculating parts 203-1A and 203-1B, the multiplying parts 203-2A and 203-2B and the adding part 203-3 (loss calculation processing S203-1A and S203-1B, multiplication processing S303-2A and S203-2B, and addition processing S203-3) are similar to those in related art 2.

The third model updating part 303 is different from the second model updating part 203 in that a mean squared error (MSE) between an intermediate feature amount of the model to be trained and an intermediate feature amount of the trained model is used as a new loss. This new loss is expressed as in the following expression.

$$L_{MSE-KD}(\theta)=L_{KD}(\theta)+\rho L_{MSE}(\theta) \qquad (8)$$

$L_{KD}(\theta)$ in a first term is similar to the value obtained in expression (7) at the second model updating part 203. $L_{MSE}(\theta)$ in a second term is a loss obtained by the second loss calculating part 303-1 which will be described later, and ρ is a hyper parameter which determines a weight of the loss. The parameter updating part 303-5 updates parameters of the model using this loss $L_{MSE-KD}(\theta)$.

[Second Loss Calculating Part 303-1]
Input: intermediate feature amount of (model to be trained), intermediate feature amount of trained model
Output: loss $L_{MSE}(\theta)$
Processing:

The second loss calculating part 303-1 obtains a deviation between intermediate output (intermediate feature amount) of the model to be trained and intermediate output (intermediate feature amount) of the trained model as a loss using a mean squared error (MSE) indicated in the following expression (S302).

$$L_{MSE}(\theta)=\|h_{trained}^{(m)}-h_{train}^{(n)}\|_2^2 \qquad (9)$$

A first term indicates an intermediate feature amount in the m-th layer of the trained model, a second term indicates an intermediate feature amount in the n-th layer of the model to be trained, and a sum of squares of the difference is used as a loss.

As indicated in expression (9), it is necessary to use the same number of dimensions in arbitrary m-th and n-th layers to calculate a loss using the MSE. Thus, in a case where the number of dimensions is different between $h_{trained}^{(m)}$ and $h_{train}^{(n)}$, the loss $L_{MSE}(\theta)$ cannot be obtained. To address this, for example, an intermediate feature amount of a bottleneck layer (layer for which the number of units is reduced compared to that in other layers) of the trained model is used as $h_{trained}^{(m)}$ to make the number of dimensions match the number of dimensions of the intermediate feature amount in the n-th layer of the model to be trained. Further, the model to be trained may be constituted so that the number of dimensions of the intermediate layer of the model to be trained matches the number of dimensions of the bottleneck layer of the trained model. Note that there may be two or more intermediate layers whose number of dimensions is the same between the trained model and the model to be trained, and calculation of expression (9) may be performed using intermediate layers of any of them. However, typically, the loss in expression (9) is preferably obtained using an intermediate feature amount in a layer one layer before the output layer (for example, in a case where the model to be trained and the trained model include the same number of layers of the neural network, the layer one layer before is m=n=L−1 (L is an output layer)), because property of the neural networks (such as a convolutional neural network and a recurrent neural network with long short-term memory) corresponding to the intermediate feature amount extracting parts 101 and 101B is often different between the trained model and the model to be trained, while, among these, property of the layer immediately before the output layer is the same in many models.

The multiplying part 303-2 multiplies the loss $L_{MSE}(\theta)$ by the hyper parameter ρ to obtain a product $\rho L_{MSE}(\theta)$. The adding part 303-4 adds $L_{KD}(\theta)$ which is an output value of the adding part 203-3 and $\rho L_{MSE}(\theta)$ to obtain a sum $L_{KD}(\theta)+\rho L_{MSE}(\theta)$. Note that $L_{MSE-KD}(\theta)$ is set such that $$L_{MSE-KD}(\theta)=L_{KD}(\theta)+\rho L_{MSE}(\theta) \tag{8}$$

$L_{MSE-KD}(\theta)$ is set as a final loss.
[Parameter Updating Part 303-5]
Input: model before updating, loss $L_{MSE-KD}(\theta)$
Output: updated model
Processing:

The parameter updating part 303-5 updates the model using the following expression to decrease a value of $L_{MSE-KD}(\theta)$.

[Formula 14]

$$\hat{W} = W - \epsilon \frac{\partial C}{\partial W} \tag{4}$$

In the expression, $C=L_{MSE-KD}(\theta)$. The bias $b_j$ is also updated in a similar manner. Note that the updated parameter may be stored in a storage part which is not illustrated and may be utilized upon next updating. Processing of extracting an intermediate feature amount, calculating an output probability and updating a model is repeated for each pair of the feature amount of the training data and the correct unit identification number, and a model at a time point at which a predetermined number of times (normally, several ten times to several hundred times) of repetition has been completed (in a case where S304 in FIG. 5: Yes) is utilized as the trained model.

Effects

According to the above-described configuration, behavior in the middle of the model to be trained is trained so as to resemble the trained model, which makes a value of the model closer to a value of the output probability of the trained model with high performance, so that it is possible to construct a higher-accuracy acoustic model compared to a case where training is performed using a loss function as in related art 1 and related art 2.

Modified Example 1

In the first embodiment, generality of the present invention has been described. A modified example can include an example where performance of a small acoustic model is made closer to a large acoustic model by making the small acoustic model imitate output and intermediate output of the trained large acoustic model.

For example, in a case where the large acoustic model is utilized as the trained acoustic model, there is a case where the number of units of the intermediate layer (for example, the intermediate layer which is one layer before the output layer) which is desired to be utilized is larger than the number of units of the intermediate layer (for example, the intermediate layer which is one layer before the output layer) of the model to be trained (small acoustic model). In this case, first, a bottleneck layer having the same number of dimensions as the number of dimensions of output of the intermediate layer of the model to be trained (small acoustic model) is provided at the intermediate layer of the model which is to be utilized as the trained model. For example, a bottleneck layer having the same number of dimensions as the number of dimensions of output of the intermediate layer (for example, the intermediate layer which is one layer before the output layer) of the model to be trained (small acoustic model) is inserted before the output layer of the trained large acoustic model. Then, the trained large acoustic model in which the bottleneck layer is provided is trained again using training data (the feature amount for training and the correct solution) which is the same as that used when the trained large acoustic model is trained, and the trained model is used as a new trained model. The acoustic model to be trained can be trained using a method similar to that in the first embodiment using an intermediate feature amount of the bottleneck layer of the new trained model which is input to the third model updating part 303.

Modified Example 2

The acoustic model learning apparatus may employ a configuration where the acoustic model learning apparatus includes the intermediate feature amount extracting part 101B, the output probability distribution calculating part 102B, and the third model updating part 303, and does not include the intermediate feature amount extracting part 101 and the output probability distribution calculating part 102. An external device may employ a configuration where the external device includes components corresponding to the intermediate feature amount extracting part 101 and the output probability distribution calculating part 102, calculates an intermediate feature amount and output probability distribution of the trained acoustic model using training data including the feature amount for training as input, and outputs the intermediate feature amount and the output probability distribution to the acoustic model learning apparatus.

Modified Example 3

In the present embodiment, the adding part 203-3 calculates the loss $L_{KD}(\theta)$ using the following expression.

$$L_{KD}(\theta)=(1-\lambda)L_{Hard}(\theta)+\lambda L_{Soft}(\theta) \quad (7)$$

In this event, there can be a configuration where $\lambda=0$ or $\lambda=1$. In a case where $\lambda=0$, it is not necessary to obtain $L_{Soft}(\theta)$, and thus, the loss calculating part 203-1A, the multiplying part 203-2A and the adding part 203-3 do not have to be provided. Further, in a case where $\lambda=1$, it is not necessary to obtain $L_{Hard}(\theta)$, and thus, the loss calculating part 203-1A, the multiplying part 203-2A and the adding part 203-3 do not have to be provided. Note that the output probability distribution (distribution of $p_j$) of the model to be trained is required both to obtain $L_{Hard}(\theta)$ and to obtain $L_{Soft}(\theta)$, and thus, it can be said that $L_{KD}(\theta)$ is a value based on the output probability distribution of the model to be trained.

[Formula 15]

$$L_{Hard}(\theta)=-\Sigma_{j=1}^{K} f_j \log p_j \quad (5)$$

[Formula 16]

$$L_{Soft}(\theta)=-\Sigma_{j=1}^{K} q_j \log p_j \quad (6)$$

Other Modified Examples

The present invention is not limited to the above-described embodiment and modified examples. For example, the above-described various kinds of processing may be executed parallelly or individually in accordance with processing performance of a device which executes the processing or as necessary as well as being executed in chronological order in accordance with described order. Other changes are possible as appropriate within the scope not deviating from the gist of the present invention.

Further, the present invention may be implemented as other neural network learning apparatuses by changing an input feature amount and an output label as well as speech. As an example, it is possible to implement the present invention as a neural network learning apparatus of an image recognition model using operation which is the same as the operation of the intermediate feature amount extracting part, the output probability distribution calculating part and each loss calculating part of all models used in the present invention and by changing the input acoustic feature amount to an image feature amount and changing the number of phonemes of the output to a label such as an object and an animal in an image. By changing the input feature amount and the output label as appropriate in this manner, the present invention can be applied in a similar manner to an arbitrary model which is capable of training output of a label with respect to an arbitrary feature amount such as a picture and language other than a speech and an image.

<Program and Recording Medium>

Further, various kinds of processing functions at the respective devices described in the above-described embodiment and modified examples may be implemented with a computer. In this case, processing of the functions to be performed at the respective devices is described with a program. Further, the various kinds of processing functions at the respective devices described above are implemented on the computer by this program being executed at the computer.

The program which describes details of the processing can be recorded in a computer-readable recording medium. Examples of the computer-readable recording medium can include, for example, a magnetic recording device, an optical disk, a magnetooptical recording medium and a semiconductor memory.

Further, this program is distributed by, for example, a portable recording medium such as a DVD and a CD-ROM in which the program is recorded being sold, given, lent, or the like. Still further, it is also possible to distribute this program by storing the program in a storage device of a server computer and transferring the program from the server computer to other computers via a network.

A computer which executes such a program, for example, first, stores a program recorded in the portable recording medium or a program transferred from the server computer in a storage part of the own computer once. Then, upon execution of the processing, this computer reads the program stored in the storage part of the own computer and executes the processing in accordance with the read program. Further, as another execution form of this program, the computer may directly read a program from the portable recording medium and execute the processing in accordance with the program. Still further, the computer may sequentially execute the processing in accordance with the received program every time the program is transferred from the server computer to this computer. Further, it is also possible to employ a configuration where the above-described processing is executed by so-called ASP (Application Service Provider) service which implements processing functions only by an instruction of execution and acquisition of a result without the program being transferred from the server computer to this computer. Note that, it is assumed that the program in the present form includes information which is to be used for processing by an electronic computer, and which is equivalent to a program (not a direct command to the computer, but data, or the like, having property specifying processing of the computer).

Further, while the present device is constituted by a predetermined program being executed on the computer, at least part of the processing may be implemented with hardware.

What is claimed is:

1. A model learning apparatus for training an acoustic model comprising:
   a hardware processor that:
   retrieves an intermediate feature amount of a first model, wherein the first model represents a trained acoustic model comprising a combination of an initial layer, a plurality of intermediate layers, and an output layer, and
   the trained acoustic model converts a feature amount extracted from an acoustic signal for training into a first output probability distribution of phoneme state in voice recognition;
   updates a parameter of a second model on a basis of a first loss for a feature amount for training and a second loss for the feature amount for training,
   wherein the first loss is based on output probability distribution of an output layer of the second model which is a neural network model as a voice recognition model to be trained, the second loss is based on the intermediate feature amount of an m-th intermediate layer of the first model and an intermediate feature amount of an n-th intermediate layer of the second model, a number of dimensions of the m-th intermediate layer of the first model is same as a number of dimensions of the n-th intermediate layer of the second model, and wherein a trained second model is used in voice recognition where an input speech signal is converted into output text.

2. The model learning apparatus according to claim 1, wherein the second model is a neural network acoustic model and the first model is a neural network acoustic model.

3. The model learning apparatus according to claim 1, wherein, in a case where the number of dimensions of an intermediate layer of the second model is smaller than the number of dimensions of an intermediate layer of a model to be utilized as the first model, a bottleneck layer having the same number of dimensions as the number of dimensions of the intermediate layer of the second model is provided between an output layer of the model to be utilized as the first model and a layer one layer before the output layer, and a model which is trained again on a basis of the feature amount for training and a correct solution to the feature amount for training is used as the first model.

4. The model learning apparatus according to claim 1, wherein the hardware processor calculates a first A loss from output probability distribution of the first model for the feature amount for training and the output probability distribution of the second model for the feature amount for training; and the hardware processor calculates a first B loss from a correct solution to the feature amount for training and the output probability distribution of the second model for the feature amount for training, and the first loss includes the first A loss and the first B loss.

5. A model learning method, implemented by a model learning apparatus that includes a hardware processor, comprising:

a retrieving step in which the hardware processor retrieves an intermediate feature amount of a first model, wherein the first model represents a trained acoustic model comprising a combination of an initial layer, a plurality of intermediate layers, and an output layer, and the trained acoustic model converts a feature amount extracted from an acoustic signal for training into a first output probability distribution of phoneme state in voice recognition;

a parameter updating step in which the hardware processor updates a parameter of a second model on a basis of a first loss for a feature amount for training and a second loss for the feature amount for training, wherein the first loss is based on output probability distribution of an output layer of the second model which is a neural network model as a voice recognition model to be trained, the second loss is based on the intermediate feature amount of an m-th intermediate layer of the first model and an intermediate feature amount of an n-th intermediate layer of the second model, a number of dimensions of the m-th intermediate layer of the first model is same as a number of dimensions of the n-th intermediate layer of the second model, and wherein a trained second model is used in voice recognition where an input speech signal is converted into output text.

6. The model learning method according to claim 5, wherein the second model is a neural network acoustic model and the first model is a neural network acoustic model.

7. The model learning method according to claim 5, wherein the number of dimensions of an m-th layer of the first model is the same as the number of dimensions of an n-th layer of the second model.

8. The model learning method according to claim 5, wherein, in a case where the number of dimensions of an intermediate layer of the second model is smaller than the number of dimensions of an intermediate layer of a model to be utilized as the first model, a bottleneck layer having the same number of dimensions as the number of dimensions of the intermediate layer of the second model is provided between an output layer of the model to be utilized as the first model and a layer one layer before the output layer, and a model which is trained again on a basis of the feature amount for training and a correct solution to the feature amount for training is used as the first model.

9. A non-transitory computer-readable recording medium having recorded thereon a program for causing a computer to function as the model learning apparatus according to claim 1.

* * * * *